United States Patent [19]

Zilges et al.

[11] E Re. 30,688

[45] Reissued Jul. 28, 1981

[54] EXTRUSION PRESS FOR INDIRECT EXTRUSION

[75] Inventors: Franz J. Zilges, Monchen-Gladbach; Klaus Siegert, Berlin, both of Fed. Rep. of Germany

[73] Assignee: Schloemann-Siemag Aktiengesellschaft, Dusseldorf, Fed. Rep. of Germany

[21] Appl. No.: 963,438

[22] Filed: Nov. 24, 1978

Related U.S. Patent Documents

Reissue of:

[64] Patent No.: 4,052,877
Issued: Oct. 11, 1977
Appl. No.: 660,936
Filed: Feb. 24, 1976

[30] Foreign Application Priority Data

Mar. 5, 1975 [DE] Fed. Rep. of Germany ..... 2509490

[51] Int. Cl.[3] ..... B21C 23/02; B21C 35/04; B21C 35/06

[52] U.S. Cl. ..... 72/273.5; 72/255; 72/272; 72/273

[58] Field of Search ..... 72/253, 255, 256, 263, 72/264, 265, 271-273

[56] References Cited

U.S. PATENT DOCUMENTS

| | | | |
|---|---|---|---|
| 3,034,642 | 5/1962 | Graham | 72/255 |
| 3,068,515 | 12/1962 | Thomas | 72/253 R |
| 3,695,081 | 10/1972 | Gartner | 72/254 |
| 3,738,144 | 6/1973 | Doudet | 72/255 |
| 4,198,847 | 4/1980 | Russell et al. | 72/705 |

FOREIGN PATENT DOCUMENTS

| | | | |
|---|---|---|---|
| 450032 | 9/1927 | Fed. Rep. of Germany | 72/272 |
| 1127305 | 4/1962 | Fed. Rep. of Germany | 72/273 |
| 1452291 | 1/1969 | Fed. Rep. of Germany | 72/255 |
| 2202151 | 7/1972 | Fed. Rep. of Germany | 72/253 A |
| 41-10620 | 7/1966 | Japan | 72/257 |
| 255481 | 11/1926 | United Kingdom | 72/273 |
| 781684 | 8/1957 | United Kingdom | 72/273 |
| 1235182 | 6/1971 | United Kingdom | 72/273 |
| 206515 | 6/1968 | U.S.S.R. | 72/253 R |

*Primary Examiner*—Lowell A. Larson
*Attorney, Agent, or Firm*—Holman & Stern

[57] ABSTRACT

An extrusion press for indirect extrusion has a sealing plate at one end of the bore of the billet container. This sealing plate extends a certain distance into the bore where it provides a seal against the wall of the bore. The plate also has a recess for accommodating a dummy block during extrusion, and a piston is provided behind the sealing plate to push the dummy block and butt end out of the recess at the end of extrusion.

4 Claims, 6 Drawing Figures

1
2
3
4
5
6
7
8
9
17
18
19
20
21
21'
21''
21'''
22
22'
23
24
27
28
73

EXTRUSION PRESS FOR INDIRECT EXTRUSION

Matter enclosed in heavy brackets [ ] appears in the original patent but forms no part of this reissue specification; matter printed in italics indicates the additions made by reissue.

The invention relates to a sealing plate or plug for closing the end of a billet container bore during indirect extrusion. The invention extends to a sealing plate arrangement and to an extrusion press including such an arrangement. The invention is suitable for use in the indirect extrusion of both light and heavy metals.

Indirect extrusion is carried out by forcing a billet container containing an extrusion billet over a die mounted on the end of a hollow stem. The extruded section leaves the press along the hollow stem. The back end of the billet container bore is closed by a sealing plate, and at the end of the extrusion process, a butt end or extrusion discard is left against this plate. The sealing plate must seal tightly in the bore to prevent the billet material from flowing out and provision must be made for separating the butt end from the sealing plate after extrusion.

An indirect metal extrusion press is known (German Offenlegungsschrift 2,202,151), in which the sealing plate is hollow at its front end and the diameter of the hollow corresponds to the diameter of the container bore. This hollow recess can contain part of the extruded billet as an extension of the container bore. The recess in the sealing plate however is filled completely with new extruded material during the first extrusion operation, and in all further extrusions the sealing plate recess remains filled with old extruded material from the first operation. The object of this invention was to carry out an extrusion operation without a butt end and thus without material loss, while still preventing the die and sealing plate from coming into contact at the end of the extrusion process. The disadvantage of this construction is that when a new billet is slid into the container bore, oxide particles and scale collect in front of the butt end remaining in the sealing plate. These particles, in the case of extrusion without a butt end, flow into the extruded section at the end of the extrusion process and impair the product quality. In extruding light and heavy metal, in particular brass, funnel formation and piping occur in indirect extrusion processes at the end of extrusion. For this reason a butt end is necessary to obtain a satisfactory extruded product.

In this construction the sealing plate lies flat, hard up against the end of the container. Thus material to be extruded can flow radially outwards between the abutting surfaces if these sealing surfaces are damaged, or if the sealing pressure between the container and moving cross-head is too low or if metal residue sticks to the sealing surfaces after the shearing operation. A further disadvantage is that the tightly fitting sealing plate lies outside the heated billet container, so that during the extrusion process heat is extracted from the billet to be extruded. This leads to non-uniform product quality over the length of the extruded article.

A device for removing the extrusion residue in an indirect metal extrusion press is also known (German Pat. No. 1,452,291). This comprises a shearing mandrel axially slidable in the sealing plate for separating the extruded article from the butt end and for then pressing the butt end out of the sealing plate. This is done by a shoulder disposed on the shearing mandrel pressing against a pressure plate, which completely fills the front end recess in the sealing plate, after the extrusion has been cut by the shearing mandrel descending into the die opening. The pressure plate then moves against the butt end still in the sealing plate. The power for this pressing action is obtained from a hydraulically operated piston located on the axis of extrusion behind the shearing mandrel.

A disadvantage of this is that this shearing operation can only be carried out in practice if a shearing mandrel adapted to the extruded profile is available. In single extrusion presses extruding profiles of simple cross-section this is attainable, but is limited by the fact that when extruding a new profile, both the shearing mandrel and the guide piece for the shearing mandrel must be changed.

According to the invention, there is provided a sealing plate for sealing one end of the bore of a billet container in an indirect extrusion press, the sealing plate having a cylindrical part, with a cylindrical interior recess, adapted to fit tightly into the container bore, the cylindrical recess being shaped so as to receive a dummy block, and an aperture in the sealing plate through which a piston can act to eject the dummy block and butt end from the recess, when required.

The invention also extends to an extrusion press for indirect extrusion which comprises a counter platen and a cylinder cross-head joined by tie rods, a hollow stem mounted at one end on the counter platen and carrying a die at its other end, a billet container, a moving cross-head movable between the cylinder cross-head and the counter platen so as to move the billet container over the hollow stem, and carrying a sealing plate having a hollow cylindrical part which fits tightly into the bore of the billet container for sealing one end thereof, the hollow cylindrical part forming a cylindrical interior recess for receiving a dummy block, and a piston projecting through an aperture in the sealing plate and actuable to push the dummy block out of the recess.

In a further development of the invention, the dummy block to be inserted into the recess may be heated outside the press and slid before the respective extrusion operation into the recess in the sealing plate, and withdrawn from the recess by means of the piston together with the butt end at the end of the extrusion process.

As a result of heating the dummy block before the extrusion operation, no heat will be extracted from the billet to be extruded. The extension of the hollow cylindrical sealing plate into the bore of the billet container means that, in addition to efficient sealing, the part of the sealing plate extending into the container is heated by the container.

The inner diameter of the sealing plate recess may be approximately equal to the bore diameter of the billet container. This construction is used advantageously in extruding heavy metal and separating with a saw between the butt end and die with the extruded section partly drawn back after extrusion. With this method of centering, the die cannot be satisfactorily supported during shearing.

The thickness of the dummy block to be inserted into the recess in the sealing plate may be advantageously chosen in accordance with the required butt end thickness. In this case the thickness of the butt end depends upon the deformation ratio and billet diameter.

In indirect extrusion with cold or hot lubricated billets, the dummy block may be connected to the piston and its thickness may fill the depth of the recess in the sealing plate. In this way, lubricant may be compressed between the annular surface of the dummy block and the inner wall of the recess. The gap between the centering surfaces of the sealing plate and container bore is on the one hand made as small as possible and the gap between the centering surfaces of the dummy block and the bore of the sealing plate recess is on the other hand made as large as possible. During the extrusion process, lubricant previously placed in the sealing plate recess is brought up to pressure and the hollow cylindrical part of the plate is so deformed in its elastic region that an efficient seal is assured between the container bore and sealing plate.

The invention will be further described, by way of example, with reference to the accompanying drawings, in which.

Figure 1:
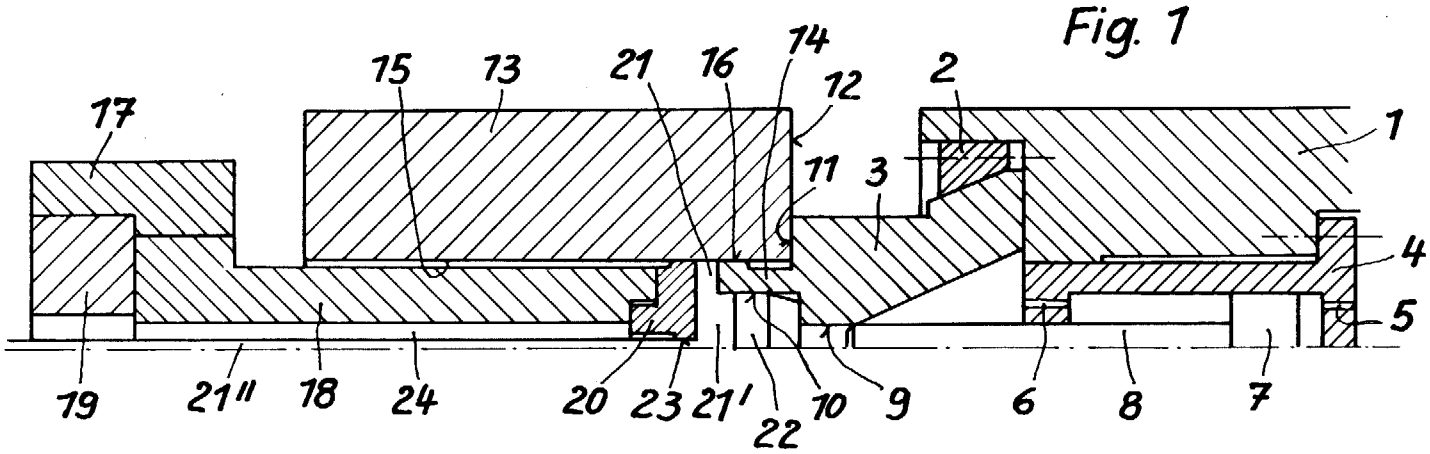
FIG. 1 is a sectional view, on one side only of a press center line, of a first embodiment of the invention at the end of the extrusion process.

In an indirect metal extrusion press, which is not illustrated in detail but which comprises a cylinder cross-head, counter platen and tie-rods connecting these latter, and a main operating ram sliding in the cylinder of the cylinder cross-head with a moving cross-head 1 fixed to this ram. A sealing plate 3 is provided at the end of the moving cross-head facing the counter platen, and is centered by means of a clamping and centering ring 2. A cylinder 4 acting as a push-out device is disposed in the moving cross-head 1 on the extrusion axis behind the sealing plate 3, and a double-acting piston 7 is guided in this cylinder and is actuated by way of bores 5 and 6. Its piston rod is in the form of a plunger 8. The plunger 8 is guided in a bore 9 in the sealing plate 3.

At the front end of the cylindrical sealing plate 3 facing the counter platen, there is provided a cylindrical recess 10 into which the plunger 8 acts. During the extrusion process the sealing plate 3 lies with a shoulder 11 against one end 12 of a billet container 13. A hollow cylindrical part 14 of the sealing plate is therefore accurately centered by its cylindrical annular surface 16 in the bore 15 of the billet container 13, where it is a tight fit, during the extrusion process.

A tool support 17 is provided on the counter platen, not shown, and a hollow stem 18 is centrally fixed there, on a supporting pressure plate 19. A die 20 is provided at the front end facing the sealing plate 3. The billet container 13, which is guided on press guides, not shown, and is axially slidable by means of hydraulically operated sliding pistons and piston rods, not shown, receives a billet 21 in its bore before the extrusion process starts. To load the ingot 21, the moving cross-head 1 with the sealing plate 3 is moved towards the right, and the billet 21 is inserted into the bore 15.

A dummy block 22 is inserted, before the extrusion process starts, into the recess 10 of the sealing plate 3. This block 22, against which the butt end or extrusion discard 21' of the billet 21 rests, is heated outside the press before the extrusion process to avoid loss of heat due to the billet having to heat the block up.

To carry out the extrusion process the moving cross-head 1 is first moved to the left together with the sealing plate 3, so that the shoulder 11 rests against the front end 12 of the billet container 13, and the billet is contained between the die 20 and the hollow cylindrical part 14 of the sealing plate.

At the beginning of the extrusion process a part of the billet 21 rests in the form of the future butt end 21' in the recess 10 against the heated dummy block 22. The extrusion 21'' which forms during the extrusion process flows towards the left through the opening 23 in the die 20 and the bore 24 of the stationary stem 18. The billet container 13 is therefore made to slide by the moving cross-head together with the sealing plate, and thereby slides over the stationary stem 18 and the die 20 disposed at its front end.

The butt end 21' formed at the end of the extrusion process is located partly in the recess 10 in front of the dummy block 22, and partly between the front end of the die 20 and the front end of the hollow cylindrical part 14 of the sealing plate.

Figure 2:
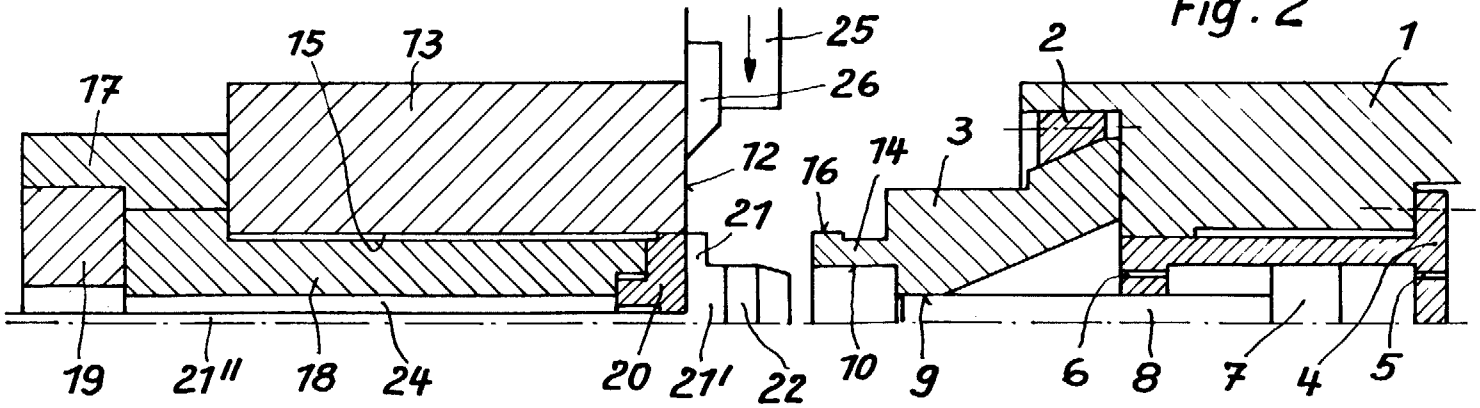
FIG. 2 is a view of the FIG. 1 embodiment with the moving cross-head and billet container retracted and the butt end projecting for shearing.

The billet container 13 is then moved completely towards the left until it abuts the tool support 17 (see FIG. 2). As the moving cross-head 1 with the sealing plate 3 travels back towards the right, the plunger 8 is actuated to push the butt end 21' and the block 22 adhering thereto, out of the recess 10. The front end 12 of the billet container 13 and the die 20 are now flush with each other. A shearing device 25 disposed on the billet container 13, or brought from outside the press, shears the butt end 21' from the extrusion 21'' with its knife 26. This method of separating the butt end from the extrusion is normally used in extruding light metal.

Figures 3, 4:
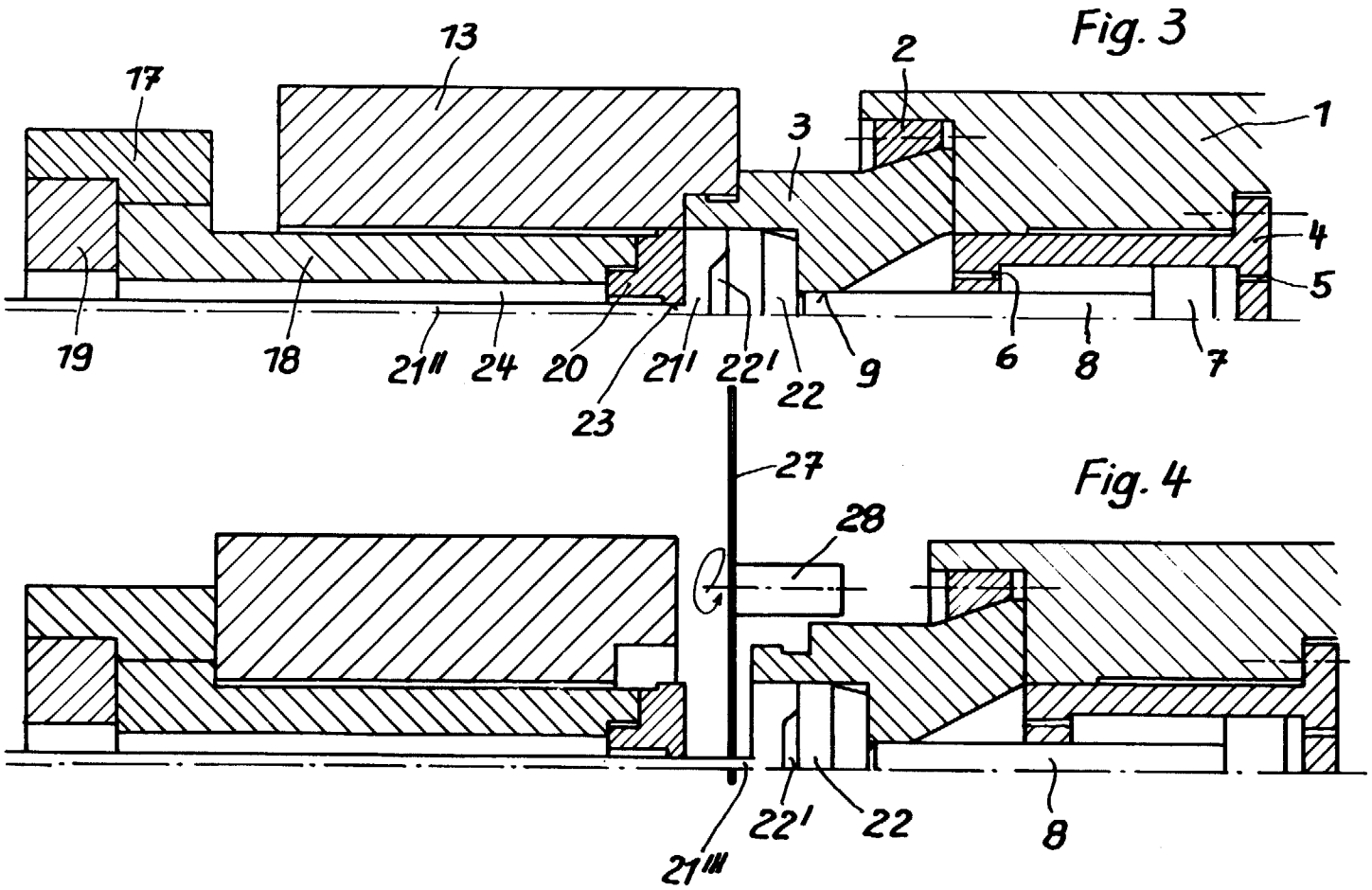
FIG. 3 is a sectional view corresponding to FIG. 1, of a second embodiment of the invention.
FIG. 4 is a view of the FIG. 3 embodiment with the moving cross-head and billet container retracted and the butt end projecting for shearing.

In FIG. 3, the inner diameter of the recess 10 of the sealing plate 3 is approximately the same as the bore diameter 15 of the billet container 13. In order to permit the hollow cylindrical part 14 of the sealing plate to take up its position in the bore of the billet container 13, this has a stepped portion 29 at one end for accepting the part 14. After the extrusion 21'' has been extruded (see FIG. 4) and the billet container 13 has travelled back towards the left end position, the moving cross-head 1 travels back to the right with the sealing plate. The dummy block 22, butt end 21' and extrusion 21'' are moved together towards the right because of the friction between the surface of the butt end 21' and the wall of the recess 10. A saw 27, either mounted on the press or brought from outside, and driven by a motor 28, cuts off the extrusion 21'' from the butt end. This method is normally used in the case of heavy metals. The extrusion 21'' is then pushed through the die 20 by the extrusion stump 21''' which forms part of the butt end 21', on the moving cross-head 1 being moved towards the left. When extruding heavy metal, a sealing plate having a recess 10 with inner diameter as shown in FIG. 1 may also be used. However, the larger recess is preferred, because the friction between the butt end and the recess is higher in this case and so the butt end 21' stays more securely in the recess.

The dummy block 22 shown here has a raised boss 22' on that side which faces the butt end 21'. This leads to a smaller loss of billet material during extrusion and also prevents material from the dead region of the billet flowing into the extruded section and leading to the so-called piping defect.

Figure 5:
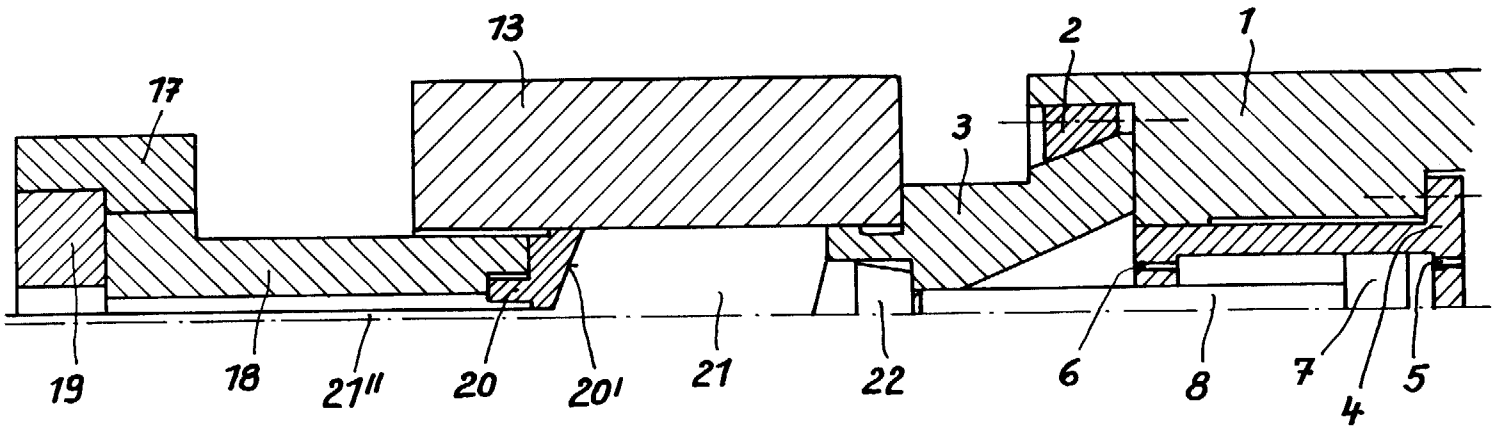
FIG. 5 is a view similar to FIGS. 1 and 3, showing a further embodiment having a special form of die inlet and dummy block.
Figure 6:
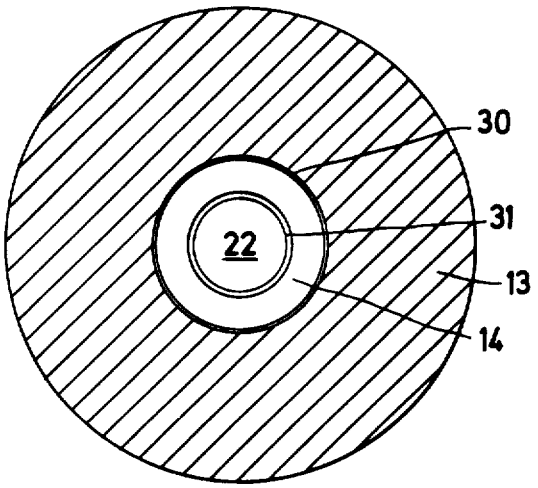
FIG. 6 is a sectional view taken along lines A—A of FIG. 5.

In FIG. 5 the die 20 is provided with a special inlet cone 20'. The billet 21 is lubricated on all sides and the dummy block 22 is provided with a front end surface corresponding to the inlet cone 20'. There is a narrow gap 30 between the billet container bore 15 and the cylindrical annular surface 16 of the sealing plate 3, and a larger gap 31 between the bore of the recess 10 and the outer diameter of the dummy block 22. Grease, or other lubricating fluid used, can flow at the beginning of extrusion through the larger gap 31 into the recess, and elastically deform the hollow cylindrical part 14 of the sealing plate 3 radially outwardly, so that the narrow gap 30 is closed and an efficient seal is obtained between the billet container bore 15 and sealing plate 3. The larger gap 31 should be as large as is possible without running the risk of the billet material entering it.

We claim:

1. An extrusion press for indirect extrusion comprising a counter platen a cylinder cross-head tie-rods connecting the counter platen and cylinder cross-head a moving cross-head a ram mounted on the cylinder cross-head for moving the moving cross-head a hollow stem mounted on the counter platen and extending towards the moving cross-head an extrusion die at the end of the hollow stem a billet container between the moving cross-head and the counter platen, which has a billet-receiving bore and which can be moved by the moving cross-head over the die and hollow stem to perform an extrusion operation a sealing plate for sealing one end of the said bore a hollow cylindrical portion provided on the sealing plate for projecting into said bore, and defining a cylindrical recess with an aperture at the bottom thereof a dummy block to be received in said cylindrical recess, *said recess being sufficiently large to receive, in addition to the dummy block, a portion of an extrusion butt-end formed in the extrusion process,* and a piston arranged in said aperture, and actuable to push the dummy block out of the recess.

[2. The extrusion press as claimed in claim 1, wherein said recess is sufficiently large to receive, in addition to the dummy block, a portion of an extrusion butt-end formed in the extrusion process.]

3. The extrusion press as claimed in claim 1, wherein the dummy block has a raised boss on its front face.

4. An extrusion press for indirect extrusion comprising a counter platen a cylinder cross-head tie-rods connecting the counter platen and cylinder cross-head a moving cross-head a ram mounted on the cylinder cross-head for moving the moving cross-head a hollow stem mounted on the counter platen and extending towards the moving cross-head an extrusion die at the end of the hollow stem a billet container between the moving cross-head and the counter platen, which has a billet-receiving bore and which can be moved by the moving cross-head over the die and hollow stem to perform an extrusion operation a sealing plate for sealing one end of the said bore a hollow cylindrical portion provided on the sealing plate for projecting into said bore, and defining a cylindrical recess with an aperture at the bottom thereof a dummy block [filling] *received in* said recess, *said recess being sufficiently large to receive, in addition to the dummy block, a portion of an extrusion butt-end formed in the extrusion process* a piston arranged in said aperture, and actuable to push the dummy block out of the said recess, and wherein a first gap defined between the outer surface of the sealing plate and the billet container bore is made as small as possible, and a second gap defined between the outer surface of the dummy block and the inner surface of the said recess is made as large as possible *without running the risk of billet material entering it*, so that the said second gap is pressurised during extrusion to elastically deform the hollow cylindrical portion into sealing contact with the container bore.

5. An extrusion press for indirect extrusion comprising:

a counter platen, a cylinder cross-head, tie-rods connecting the counter platen and the cylinder cross-head, a moving cross-head, a ram mounted on the cylinder cross-head for moving the moving cross-head, a hollow stem mounted on the counter platen and extending towards the moving cross-head, an extrusion die at the end of the hollow stem, a billet container between the moving cross-head and the counter platen, which has a billet receiving bore with a stepped portion at the moving cross-head end, the billet container being movable by the moving cross-head over the die and hollow stem to perform an extrusion operation, a sealing plate for sealing one end of said bore, a hollow cylindrical portion provided on the sealing plate for projecting into said stepped portion of said billet receiving bore and defining a cylindrical recess having a diameter equal to that of said billet receiving bore and having an aperture at the bottom thereof, a dummy block to be received in said cylindrical recess, *said recess being sufficiently large to receive, in addition to the dummy block, a portion of an extrusion butt-end formed in the extrusion process, and* a piston arranged in said aperture, and actuable to push the dummy block out of the recess.

* * * * *